US010583783B2

(12) United States Patent
Beauregard

(10) Patent No.: US 10,583,783 B2

(45) Date of Patent: Mar. 10, 2020

(54) VEHICLE INTERIOR LAYOUT

(71) Applicant: FAURECIA INTERIEUR INDUSTRIE, Nanterre (FR)

(72) Inventor: Julien Beauregard, Mesnil en Thelle (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 0 days.

(21) Appl. No.: 15/982,715

(22) Filed: May 17, 2018

(65) Prior Publication Data

US 2018/0334106 A1 Nov. 22, 2018

(30) Foreign Application Priority Data

May 18, 2017 (FR) .................................... 17 54410

(51) Int. Cl.

| | |
|---|---|
| ***B60R 7/04*** | (2006.01) |
| ***B60R 11/02*** | (2006.01) |
| ***B60N 2/14*** | (2006.01) |
| ***B60N 2/75*** | (2018.01) |
| *B60R 11/00* | (2006.01) |
| *B60K 35/00* | (2006.01) |
| *B60K 37/06* | (2006.01) |

(52) U.S. Cl.

CPC ................ *B60R 7/04* (2013.01); *B60N 2/14* (2013.01); *B60N 2/767* (2018.02); *B60N 2/773* (2018.02); *B60N 2/793* (2018.02); *B60N 2/797* (2018.02); *B60R 11/0229* (2013.01); *B60R 11/0235* (2013.01); *B60R 11/0241* (2013.01); *B60K 35/00* (2013.01); *B60K 37/06* (2013.01); *B60K 2370/1438* (2019.05); *B60K 2370/47* (2019.05); *B60K 2370/56* (2019.05); *B60K 2370/67* (2019.05); *B60K 2370/77* (2019.05); *B60K 2370/774* (2019.05); *B60K 2370/791* (2019.05); *B60K 2370/81* (2019.05); *B60K 2370/828* (2019.05); *B60R 2011/0007* (2013.01); *B60R 2011/0014* (2013.01); *B60R 2011/0075* (2013.01); *B60R 2011/0082* (2013.01); *B60R 2011/0084* (2013.01); *B60R 2011/0087* (2013.01)

(58) Field of Classification Search

CPC ... B60R 7/04; B60R 11/0229; B60R 11/0235; B60R 11/0264; B60N 2/797; B60N 2/767

USPC ..................................................... 296/24.34

See application file for complete search history.

(56) References Cited

U.S. PATENT DOCUMENTS

| | | | | |
|---|---|---|---|---|
| 6,168,126 | B1 * | 1/2001 | Stafford | B60R 11/02 248/122.1 |
| 6,585,201 | B1 * | 7/2003 | Reed | B60R 11/0235 248/181.1 |
| 6,663,155 | B1 * | 12/2003 | Malone | B60R 11/0229 224/539 |

(Continued)

FOREIGN PATENT DOCUMENTS

| | | |
|---|---|---|
| DE | 10305681 A1 | 9/2004 |
| DE | 102015107089 A1 | 11/2016 |

(Continued)

*Primary Examiner* — Jason S Morrow

(74) *Attorney, Agent, or Firm* — Reising Ethington P.C.

(57) ABSTRACT

A vehicle interior layout includes a console having a support structure configured to be mounted on the floor of the vehicle and topped by an upper part, the upper part being rotatable around a substantially vertical pivot axis (A).

15 Claims, 3 Drawing Sheets

(56) References Cited

U.S. PATENT DOCUMENTS

| | | | | |
|---|---|---|---|---|
| 8,783,752 | B2 * | 7/2014 | Lambert | B60R 16/02 296/24.34 |
| 2002/0163215 | A1 * | 11/2002 | Emerling | B60N 3/101 296/24.34 |
| 2004/0016588 | A1 | 1/2004 | Vitale | |
| 2004/0164210 | A1 * | 8/2004 | Le | B60R 11/0235 248/200 |
| 2004/0245796 | A1 * | 12/2004 | Maierholzner | B60R 7/04 296/37.8 |
| 2005/0006918 | A1 * | 1/2005 | Neumann | B60R 11/0235 296/24.34 |
| 2005/0040299 | A1 * | 2/2005 | Twyford | B60R 11/0235 248/177.1 |
| 2010/0078954 | A1 * | 4/2010 | Liu | B60N 3/101 296/24.34 |
| 2010/0201147 | A1 * | 8/2010 | Jones | B60R 7/04 296/24.34 |
| 2014/0167438 | A1 | 6/2014 | Lambert et al. | |
| 2018/0186266 | A1 * | 7/2018 | Fitzpatrick | B60N 3/063 |
| 2018/0251057 | A1 * | 9/2018 | Bywaters | B60N 3/001 |
| 2018/0281689 | A1 * | 10/2018 | Cha | B60R 7/04 |
| 2019/0001841 | A1 * | 1/2019 | Vanel | B60N 3/001 |
| 2019/0077288 | A1 * | 3/2019 | Gayon | B60N 2/797 |
| 2019/0077331 | A1 * | 3/2019 | Tepper | B60R 11/0235 |

FOREIGN PATENT DOCUMENTS

| | | | |
|---|---|---|---|
| EP | 1193107 | A1 | 4/2002 |
| EP | 2460681 | A1 | 6/2012 |

* cited by examiner

A
B
D
L
x
y
z
18
20
22
24
25
26
28
30
32
34
36
38
40
42
44
46

A
B
D
L
x
y
z
18
20
22
24
25
26
28
30
32
36
38
40
44
46

VEHICLE INTERIOR LAYOUT

FIELD OF THE INVENTION

The present invention relates to the field of the interior layout of vehicles, in particular motor vehicles.

BACKGROUND OF THE INVENTION

A motor vehicle generally comprises a dashboard, located at the front of the passenger compartment, and a center console, located between the seat bottoms of the front seats. The dashboard generally bears display devices and control buttons. The center console generally bears control buttons, storage spaces, cupholders or an armrest.

SUMMARY OF THE INVENTION

It is desirable for the inner layout of a motor vehicle to be practical and ergonomic in order to facilitate the use of the vehicle and ensure the comfort of the occupants of the vehicle.

One of the aims of the invention is to provide a vehicle interior layout that is practical and ergonomic.

To that end, the invention proposes a vehicle interior layout comprising a console having a support structure configured to be mounted on the floor of the vehicle and topped by an upper part, the upper part being rotatable around a substantially vertical pivot axis.

The pivoting upper part allows the user to orient the upper part ergonomically. The use of the console is thus made easier, in particular when the console bears a display screen and/or controls for controlling one or several onboard functional systems of the vehicle.

In specific embodiments, the interior layout may comprise one or several of the following optional features, considered alone or according to all technically possible combinations:

- the interior layout comprises a display device having a display screen borne by the upper part;
- the display screen is mounted pivoting on the upper part around a substantially horizontal and/or substantially transverse pivot axis;
- the display screen is touch-sensitive;
- the console comprises a hand rest arranged on the upper part such that a user can place the forearm, the wrist or the palm of the hand on the hand rest while touching the display screen;
- the support structure is mounted sliding on the floor;
- the support structure is mounted on a carriage mounted sliding along a guide arranged on the floor;
- the support structure is configured so as to leave a free space below the upper part;
- the support structure comprises a single support foot having a lower end mounted on the floor and an upper end on which the upper part is mounted;
- the upper part defines a storage area for receiving a roaming electronic device;
- the console comprises a wireless charging device for charging a roaming electronic device received in the storage area;
- the interior layout comprises two seats arranged side by side, the console being arranged between the two seats;
- at least one of the two seats is pivoting so as to be able to be turned toward the console.

The invention also relates to a vehicle having an interior layout as defined above.

BRIEF DESCRIPTION OF THE DRAWINGS

The invention and its advantages will be better understood upon reading the following description, provided solely as an example, and done in reference to the appended drawings, in which.

DETAILED DESCRIPTION OF PREFERRED EMBODIMENTS

Figure 1:
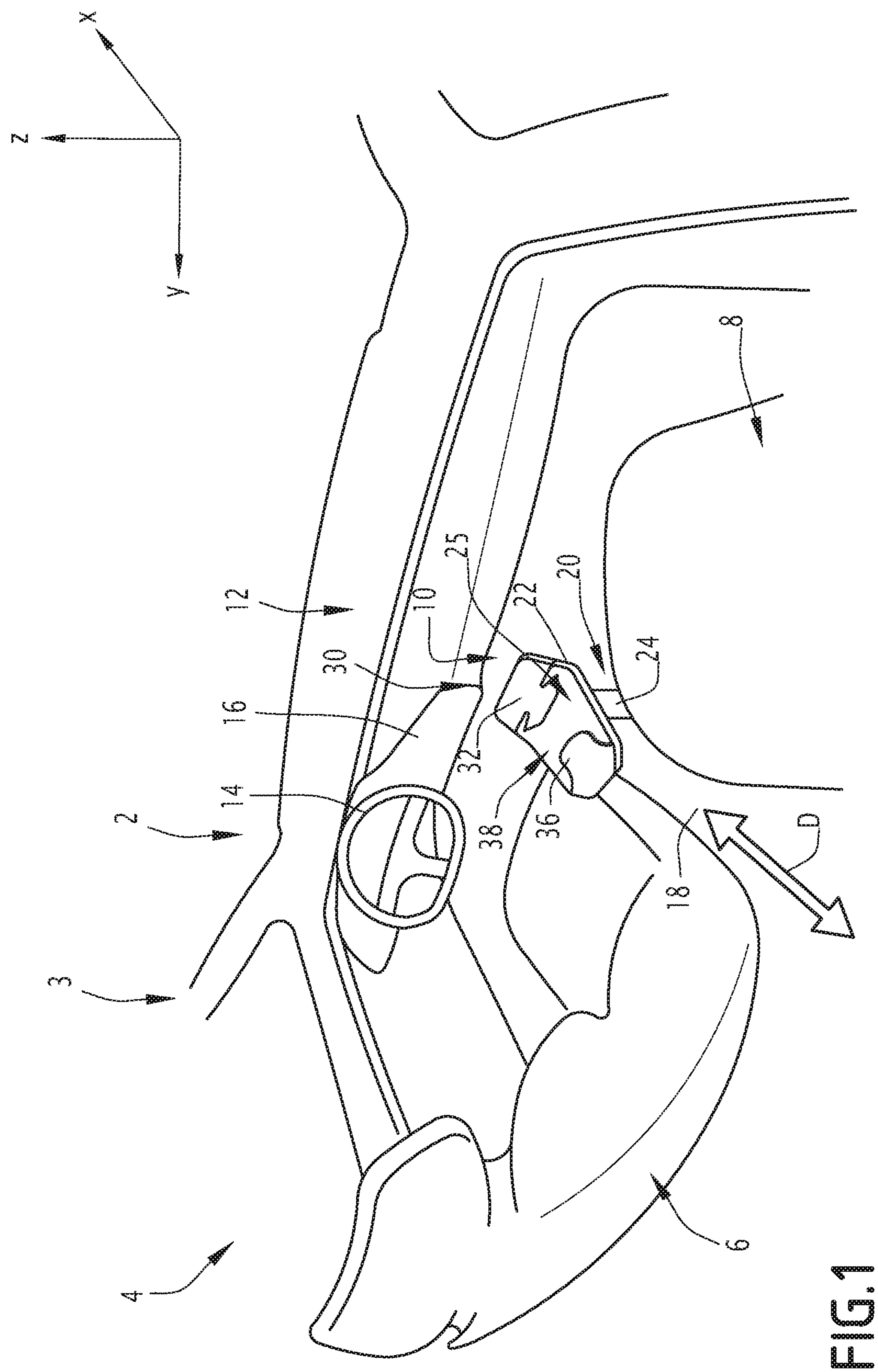
FIGS. 1 and 2 are schematic perspective views of an interior layout of a motor vehicle comprising a center console located between two front seats, in two different configurations.
Figure 2:
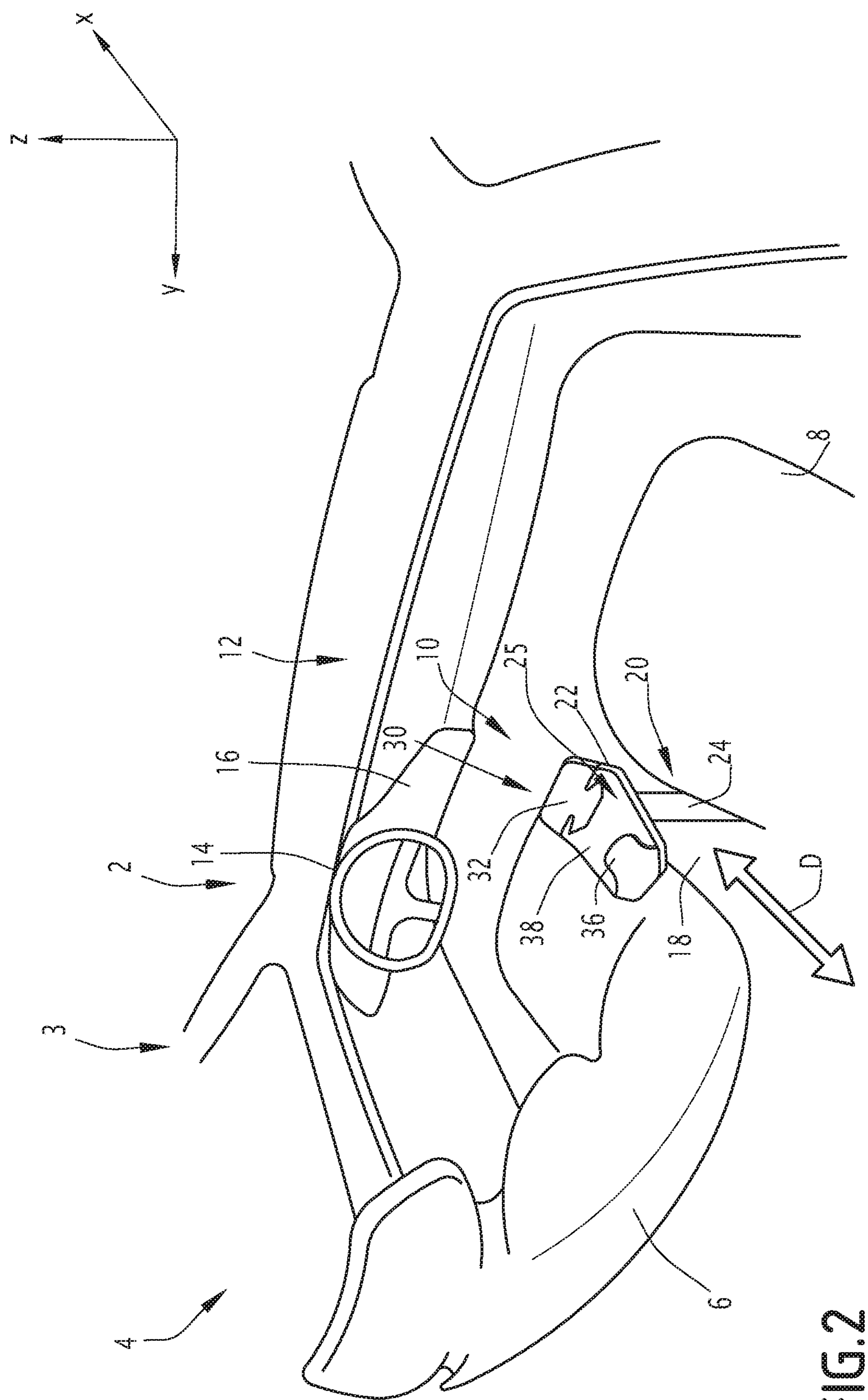

The interior layout 2 illustrated in FIGS. 1 and 2 is an interior layout of a motor vehicle 3.

In the rest of the description, the terms “horizontal”, “vertical”, “longitudinal”, “transverse”, “front”, “rear”, “top” and “bottom” should be understood in reference to the typical orthogonal coordinate system for vehicles, shown in the Figures, and comprising:

- a longitudinal axis X, horizontal and oriented from back to front,
- a transverse axis Y, horizontal and oriented from right to left, and
- a vertical axis Z, oriented from bottom to top.

The interior layout 2 comprises a row of seats 4 formed by two seats 6, 8 arranged next to one another, and a console 10 arranged between the two seats 6, 8.

The console 10 is located transversely between the two seats 6, 8, more specifically between the seat bottoms of the two seats 6, 8. Such a console 10 is also called “center console” due to its central position between the two seats 6, 8.

The point of view of FIGS. 1 and 2 is approximately that of an occupant of the seat 8 (on the right in FIG. 1), such that this seat 8 is only partially visible, only the front part of the seat bottom being visible.

The seats 6, 8 are front seats, one (on the left in FIG. 1) provided for a driver, and the other (on the right in FIG. 1) provided for a passenger.

The interior layout 2 comprises a dashboard 12 located at the front of the passenger compartment of the vehicle. The dashboard 12 is located in front of the seats 6, 8. The console 10 is distinct from the dashboard 12. The console 10 here is separated from the dashboard 12.

The dashboard 12 bears a steering wheel 14 and an instrument panel 16 that are located in front of the seat 6 of the driver.

The console 10 is mounted on the floor 18 of the vehicle 3. The console 10 here is connected only to the floor 18 of the vehicle 3. The console 10 is not connected directly to the dashboard 12.

The console 10 comprises a support or base structure 20 mounted on the floor 18 and an upper part 22 supported by the base 20. The base 20 forms the lower part of the console 10. The base 20 is topped by the upper part 22.

The base 20 here is formed by a single foot 24 extending substantially vertically, the foot 24 having a lower end mounted on the floor 18 and an upper end on which the upper part 22 is mounted.

The base 20 is configured so as to maintain a free space below the upper part 22. The upper part 22 emerges horizontally relative to the base 20. The upper part 22 is located, along the vertical axis Z, above the seat bottom of the seats 6, 8.

Thus, an occupant of the vehicle may for example place his leg below the upper part 22. This allows the occupant to position himself ergonomically relative to the console 10 when he wishes to use it. This also allows the seat bottom of the seats to pass below the upper part 22 without interference with the console 10, in particular during a rotation of at least one of the seats 6, 8 around the vertical axis Z.

In the illustrated example, the foot 24 has a section in a horizontal plane with dimensions smaller than those of the upper part 22, such that the upper part 22 horizontally overhangs the foot 24.

The upper part 22 has a functional upper surface 25 grouping together one or several functions usable by the passengers of the seats 6, 8.

The upper surface 25 is for example provided to receive a display screen, to receive commands for controlling one or several on board functional system(s) of the vehicle (for example, one or several control buttons or a touch-sensitive slab), for defining a storage space for objects (for example keys, a mobile telephone, bottles, cups) and/or for defining a bearing surface for a passenger, for example for the hand, the wrist and/or the forearm of a passenger.

The upper surface 25 of the upper part 22 defines the upper surface of the console 10 as a whole.

The upper part 22 here is generally in the form of a plate.

The upper part 22 pivots around a substantially vertical pivot axis A. This allows an occupant to place the upper part 22 in a more ergonomic position for the occupant when he wishes to use the console 10.

The upper part 22 is able to be oriented around the pivot axis A in a plurality of adjustment positions, the console 10 being configured to maintain the upper part 22 in each adjustment position.

The upper part 22 has a plurality of discrete adjustment positions in a finite or infinite number of adjustment positions between two extreme adjustment positions.

To maintain the upper part 22 in the various adjusting positions, the console 10 for example comprises a maintaining device comprising a friction brake. Such a maintaining device makes it possible to keep the upper part 22 in an infinite number of distinct adjusting positions.

Alternatively, the console 10 comprises a maintaining device comprising a notched mechanism, each notch defining a respective adjusting position. Such a maintaining device makes it possible to keep the upper part 22 in a finite number of distinct adjusting positions.

The pivot amplitude of the upper part 22 around the pivot axis A is for example +/−45° around a neutral position. In the neutral position, the upper part 22 is for example oriented along the longitudinal axis X.

The upper part 22 here is mounted pivoting relative to the base 20. To that end, the upper part 22 is for example mounted on the base 20 via a pivot link (not shown).

Alternatively or optionally, the base 20 is mounted pivoting around the pivot axis A relative to the floor 18.

The console 10 is mounted translatably relative to the floor 18. The console 10 here is mounted sliding relative to the floor 18 along a movement line L. This allows an occupant to place the console 10 ergonomically when he wishes to use it.

The console 10 is thus movable relative to the dashboard 12, which is immobile. The console 10 is movable longitudinally from front to back to be moved away from or closer to the seats 6, 8. The console 10 is movable between a forward position (FIG. 1) and a withdrawn position (FIG. 2). When it moves, the console 10 comes closer to or further from the dashboard 12.

The movement line L here is rectilinear and longitudinal, i.e., substantially parallel to the longitudinal axis X. Alternatively, the movement line L is curved.

Figure 3:
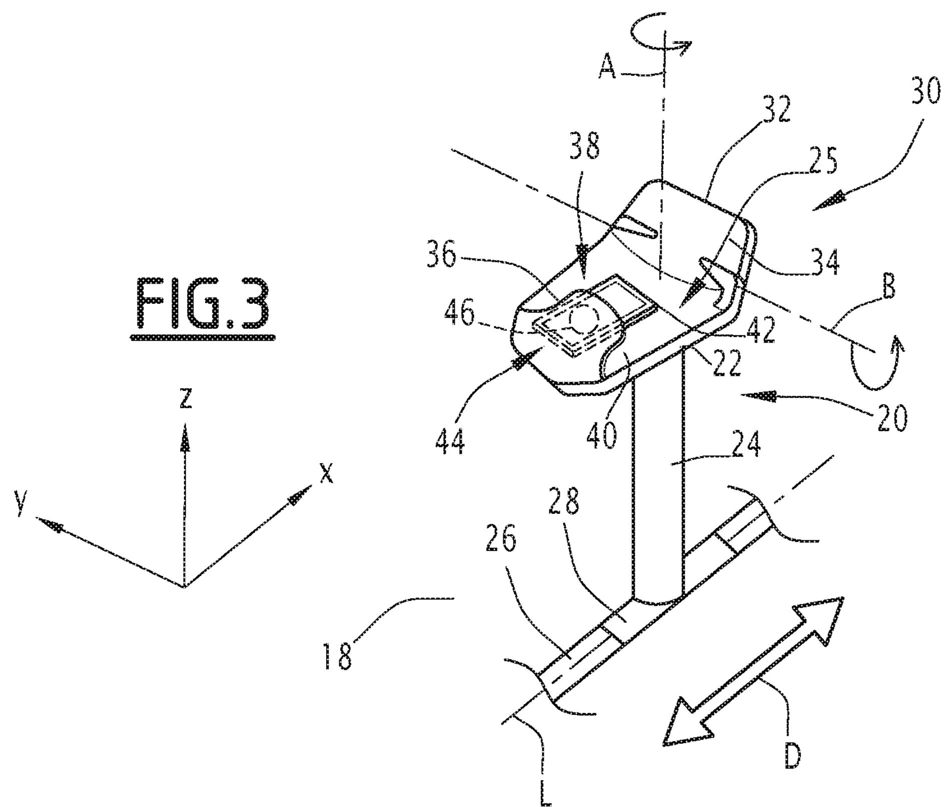
FIGS. 3 and 4 are schematic perspective views of the center console.
Figure 4:
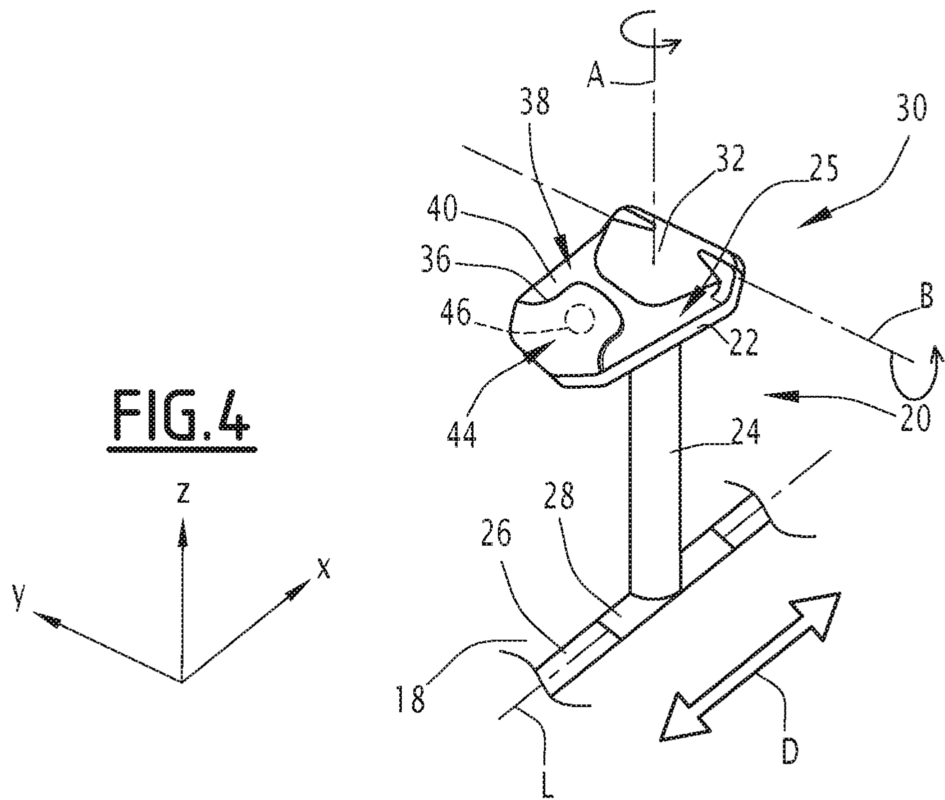

As shown in FIGS. 3 and 4, the console 10 is mounted sliding along a guide 26 arranged on the floor 18 and extending along the movement line L.

More specifically, the base 20 is mounted sliding along the guide 26. The base 20 is secured to a carriage 28 mounted sliding along the guide 26. In the illustrated example, the foot 24 is secured to the carriage 28, which is arranged at the lower end of the foot 24.

The guide 26 here is embedded in the floor 18, in particular for aesthetic reasons. Alternatively, the guide 26 is fastened on the top of the floor 18.

The console 10 comprises a display device 30 configured to display data relative to at least one functional system of the vehicle 3 or to a roaming electronic device.

Such a functional system of the vehicle is for example an audio system, an information-entertainment system, a radio navigation system, a ventilation and air-conditioning system, an on-board computer, a configuration system of the vehicle (for example making it possible to configure a power train, an active suspension system or an active exhaust system of the vehicle).

A roaming electronic device is for example a portable personal computer, a mobile telephone, in particular a smart phone, a digital tablet or a digital music player.

To display data relative to a roaming electronic device, the display device 30 is for example configured to establish a communication with the roaming electronic device.

The communication link is a wireless link, for example a radio link, in particular of the Wi-Fi® or Bluetooth® type, or a wired link, via a cable.

The display device 30 comprises a display screen 32 mounted on the upper part 22, more particularly on the upper surface 25 of the upper part 22. The display screen 32 has a display surface 34 on which the images are generated during the operation of the display screen 32.

The display screen 32 is for example a liquid crystal screen or a screen with light-emitting diodes, in particular with light-emitting diodes. The display screen 32 is preferably a matricial screen, comprising a matrix of pixels.

The display screen 32 here is arranged so as to extend substantially transversely. When the upper part 22 is oriented in a neutral position, the display screen 32 is visible by the occupants of the two seats 6, 8. The pivoting of the upper part 22 makes it possible to orient the display screen 32, preferably toward one or the other of the seats 6, 8. This allows better visibility for the occupant toward whom the display screen 32 is oriented.

The display screen 32 is mounted pivoting on the upper part 22 around a substantially horizontal rotation axis B. This makes it possible to adjust the vertical orientation of the display screen 32.

In the neutral position of the upper part 22 of the console 10, the rotation axis B is substantially transverse. It is therefore substantially parallel to the transverse axis Y of the vehicle.

In one example embodiment, the display screen 32 is movable between at least a raised position in which the display surface 34 is visible (FIG. 3), and a folded down position in which the display surface 34 is hidden (FIG. 4).

In the raised position, the display screen 32 extends substantially vertically, its display surface 34 facing the rear.

In the folded down position, the display screen 32 is folded down on the upper part 22, its display surface 34 facing downward, toward the upper part 22. In the folded down position, the display screen 34 extends substantially horizontally.

In general, advantageously, the console 10 is configured to allow the display screen 32 to be oriented by pivoting around the first axis and, optionally, by pivoting around a second axis forming a nonzero angle with the first axis, for example perpendicular to the first axis. This makes it possible to orient the display screen 32 ergonomically for a user.

In the illustrated example, the display screen 32 can be oriented by pivoting around a first horizontal axis defined by the horizontal pivot axis B of the display screen 32 relative to the upper part 22 of the console 10, and by pivoting around a second vertical axis defined by the vertical pivot axis A of the upper part 22 of the console 10.

Optionally, the display screen 32 is touch-sensitive to allow the entry of commands for a roaming electronic device or a functional system of the vehicle via the display screen 32.

Optionally or alternatively, the display device 30 comprises one or several distinct physical command(s) of the display screen 32, the actuation of each command making it possible to command a roaming electronic device or a functional system of the vehicle. A command is for example a pushbutton, a rotary button or a toggle button.

The console 10 comprises a hand rest 36 arranged on the upper part 25 so as to allow an occupant to place his forearm, his wrist or the palm of his hand while being able to touch the display screen 32.

The hand rest 36 forms part of the upper surface 25 of the upper part 22.

The hand rest 36 assumes the form of a protuberance protruding upward and arranged in front of the display screen 32. Such a hand rest 36 makes it possible to press one's hand while touching the display screen 32, without breaking the wrist upward, which is more ergonomic.

The hand rest 36 here is located at a distance from the display screen 32, such that the display screen 32 can be pivoted into the closed position while being folded down on the upper part 22 without interfering with the hand rest 36.

In the illustrated example, the display screen 32 is arranged at a front end of the upper part 22 and the hand rest 36 is arranged at a rear end of the upper part 22.

The upper part 22 comprises a storage area 38 configured to receive one or more objects.

The storage area 38 comprises a receiving surface 40. The receiving surface 40 is substantially horizontal. The storage surface 40 forms part of the upper surface 25.

The storage area 38 is configured to receive a roaming electronic device 42, such as a mobile telephone or a digital tablet.

The storage area 38 is located on the upper part 22 between the display screen 32 and the hand rest 36. The storage area 38 makes it possible to place the roaming electronic device 42 between the display screen 32 and the hand rest 36.

In the illustrated example, the storage area 38 extends partially below the hand rest 36. The latter extends here cantilevered above the storage area 38. To place the roaming electronic device 42 in the storage area 38, the user must slide it partially below the hand rest 36. This layout makes it possible to provide a certain maintenance of the roaming electronic device 42 in the storage area 38.

Optionally, the console 10 comprises a wireless charging device 44 configured for wirelessly charging a roaming electronic device 42 placed in the storage area 38.

The wireless charging device 44 for example comprises an electromagnetic winding 46 for charging a roaming electronic device 42 by induction.

The electromagnetic winding 46 is for example arranged below the storage area 38, while being integrated for example into the upper part 22.

Alternatively or optionally, the electromagnetic winding 46 is arranged above the storage area 38, while for example being integrated into the hand rest 36 extending above the storage area 38.

Optionally, at least one of the seats 6, 8 is mounted pivoting around a vertical axis so as to be able to orient the seat 6, 8 toward the console 10.

In the illustrated example, the seat 8 for the passenger is mounted pivoting relative to the floor 18 so as to be able to orient the passenger seat 8 toward the console 10. The passenger seat 8 is rotatable between a position facing forward, in which the seat 8 faces the road, and a position turned to the side, in which the seat 8 is turned to the side, for example by 1° to 20° relative to the position facing forward. Thus, the passenger can place himself in a comfortable position relative to the console 10, for example to view the display screen 32 and/or to enter commands via the display screen 32.

The interior layout 2 is practical and ergonomic.

The pivoting upper part 22 allows a user to orient the upper part 22 ergonomically, for example to view the display screen 32 and/or to enter commands via the display screen 32.

The movable console 10 makes it possible to place the console 10 horizontally ergonomically for the user. In particular, the longitudinally movable console 10 makes it possible to move the console 10 forward or backward.

The adjustable seat 8 further increases the ergonomics of the interior layout.

The grouping of certain functions together on the console 10 allows practical and ergonomic use of the console 10. The grouping of the display screen 32 and the storage area 38 makes it possible to group the display screen 32 with a roaming electronic device 42.

The hand rest 36 makes it easier to enter commands via the display screen 32 and/or on the roaming electronic device 42 received in the receiving area located between the hand rest 36 and the display screen 32.

The possibility of viewing data relative to a functional system and/or a roaming electronic device 42 and/or of entering commands via the display screen improves the ergonomics.

The invention claimed is:

1. A vehicle interior layout comprising:

a console having a support structure configured to be mounted on the floor of the vehicle and topped by an upper part, the upper part being rotatable around a substantially vertical pivot axis; and a display device having a display screen borne by the upper part of the console, wherein the display screen is movable between at least a raised position in which a display surface is visible and a folded down position in which the display surface is hidden, the display screen being folded down on the upper part, wherein the console has a hand rest arranged on the upper part such that a user can place the forearm, the wrist, or the palm of the hand on the hand rest while touching the display screen, and wherein the hand rest assumes a form of a protuberance on the upper surface of the upper part, the display screen being arranged at a front end of the upper part and the hand rest being located at a rear end of the upper part.

2. The interior layout according to claim 1, wherein the display screen is mounted pivoting on the upper part around a substantially horizontal and/or substantially transverse pivot axis.

3. The interior layout according to claim 1, wherein the display screen is touch-sensitive.

4. The interior layout according to claim 1, wherein the upper part is generally in the form of a plate.

5. The interior layout according to claim 1, wherein the support structure is mounted sliding on the floor.

6. The interior layout according to claim 5, wherein the support structure is mounted on a carriage mounted sliding along a guide arranged on the floor.

7. The interior layout according to claim 1, wherein the support structure is configured so as to leave a free space below the upper part.

8. The interior layout according to claim 1, wherein the support structure comprises a single support foot having a lower end mounted on the floor and an upper end on which the upper part is mounted.

9. The interior layout according to claim 1, wherein the upper part defines a storage area for receiving a roaming electronic device.

10. The interior layout according to claim 9, wherein the console comprises a wireless charging device for charging a roaming electronic device received in the storage area.

11. The interior layout according to claim 1, comprising two seats arranged side by side, the console being arranged between the two seats.

12. The interior layout according to claim 11, wherein at least one of the two seats pivots so as to be able to be turned toward the console.

13. A vehicle having an interior layout according to claim 1.

14. A vehicle interior layout comprising:

a console having a support structure configured to be mounted on the floor of the vehicle and topped by an upper part, the upper part being rotatable around a substantially vertical pivot axis; and a display device having a display screen borne by the upper part of the console, wherein the display screen is movable between at least a raised position in which a display surface is visible and a folded down position in which the display surface is hidden, the display screen being folded down on the upper part, wherein the console has a hand rest arranged on the upper part such that a user can place the forearm, the wrist, or the palm of the hand on the hand rest while touching the display screen, and wherein the display screen in the raised position extends substantially vertically with the display surface facing the rear and the display screen in the folded down position extends substantially horizontally with the display screen folded onto the upper part with the display surface facing downward.

15. A vehicle interior layout comprising:

a console having a support structure configured to be mounted on the floor of the vehicle and topped by an upper part, the upper part being rotatable around a substantially vertical pivot axis, wherein the upper part defines a storage area for receiving a roaming electronic device; and a display device having a display screen borne by the upper part of the console, wherein the display screen is movable between at least a raised position in which a display surface is visible and a folded down position in which the display surface is hidden, the display screen being folded down on the upper part, wherein the console has a hand rest arranged on the upper part such that a user can place the forearm, the wrist, or the palm of the hand on the hand rest while touching the display screen, and wherein the hand rest is located at a rear end of the upper part and the display screen is located at a front end of the upper part, with the storage area extending at least in part below the hand rest.

* * * * *